(12) United States Patent
Hu et al.

(10) Patent No.: US 12,084,369 B2
(45) Date of Patent: Sep. 10, 2024

(54) WASTEWATER TREATMENT EQUIPMENT AND TREATMENT METHOD THEREOF

(71) Applicant: JEREH ENVIRONMENTAL PROTECTION TECHNOLOGY CO., LTD., Shandong (CN)

(72) Inventors: Yipeng Hu, Shandong (CN); Bin Zhang, Shandong (CN); Ruwei Deng, Shandong (CN); Rengang Liang, Shandong (CN)

(73) Assignee: JEREH ENVIRONMENTAL PROTECTION TECHNOLOGY CO., LTD., Yantai (CN)

( * ) Notice: Subject to any disclaimer, the term of this patent is extended or adjusted under 35 U.S.C. 154(b) by 170 days.

(21) Appl. No.: 17/416,927

(22) PCT Filed: Apr. 22, 2021

(86) PCT No.: PCT/CN2021/088994
§ 371 (c)(1),
(2) Date: Jun. 21, 2021

(87) PCT Pub. No.: WO2022/160482
PCT Pub. Date: Aug. 4, 2022

(65) Prior Publication Data
US 2023/0139310 A1      May 4, 2023

(30) Foreign Application Priority Data
Jan. 29, 2021   (CN) .......................... 202110127209.4

(51) Int. Cl.
*B01D 17/04*   (2006.01)
*B01D 9/00*    (2006.01)
(Continued)

(52) U.S. Cl.
CPC .............. *C02F 9/00* (2013.01); *B01D 9/0018* (2013.01); *B01D 17/047* (2013.01);
(Continued)

(58) Field of Classification Search
CPC . C02F 1/442; C02F 1/444; C02F 9/00; B01D 9/0018; B01D 61/027; B01D 61/147
See application file for complete search history.

(56) References Cited

FOREIGN PATENT DOCUMENTS

| CN | 203411427 U | 1/2014 |
|---|---|---|
| CN | 103787530 A | 5/2014 |

(Continued)

OTHER PUBLICATIONS

Mozia, Sylwia, and Maria Tomaszewska. "Treatment of surface water using hybrid processes-adsorption on PAC and ultrafiltration " Desalination 162 (2004): 23-31. (Year: 2004).*

(Continued)

*Primary Examiner* — Bradley R Spies
(74) *Attorney, Agent, or Firm* — XSENSUS LLP

(57) ABSTRACT

A wastewater treatment equipment and a treatment method of a wastewater are provided. The wastewater treatment equipment includes: a microfiltration unit, configured to receive and filter a wastewater to obtain a solution; a membrane salt separation unit, configured to receive the solution and separate monovalent ions and multivalent ions from the solution to obtain a first solution including the monovalent ions and a second solution including the multivalent ions; a first evaporative crystallization unit, configured to crystallize the first solution to form a monovalent salt; and a second evaporative crystallization unit, configured to crystallize the second solution to form a mixed salt; the microfiltration unit is connected to the membrane salt separation unit, and the first evaporative crystallization unit and the second evaporative crystallization unit are both (Continued)

directly connected to the membrane salt separation unit, the wastewater treatment equipment can achieve the standard discharge of wastewater.

18 Claims, 5 Drawing Sheets

(51) Int. Cl.
| | |
|---|---|
| *B01D 61/02* | (2006.01) |
| *B01D 61/14* | (2006.01) |
| *B01D 61/58* | (2006.01) |
| *B01D 65/02* | (2006.01) |
| *B01D 69/02* | (2006.01) |
| *B01D 71/34* | (2006.01) |
| *C02F 1/00* | (2023.01) |
| *C02F 1/04* | (2023.01) |
| *C02F 1/44* | (2023.01) |
| *C02F 1/52* | (2023.01) |
| *C02F 1/66* | (2023.01) |
| *C02F 9/00* | (2023.01) |
| *C02F 5/00* | (2023.01) |
| *C02F 11/122* | (2019.01) |
| *C02F 101/10* | (2006.01) |
| *C02F 103/10* | (2006.01) |

(52) U.S. Cl.
CPC ......... *B01D 61/025* (2013.01); *B01D 61/027* (2013.01); *B01D 61/147* (2013.01); *B01D 61/58* (2013.01); *B01D 65/02* (2013.01); *B01D 69/02* (2013.01); *B01D 71/34* (2013.01); *B01D 2313/243* (2013.01); *B01D 2325/02832* (2022.08); *B01D 2325/02834* (2022.08); *C02F 2001/007* (2013.01); *C02F 1/048* (2013.01); *C02F 1/441* (2013.01); *C02F 1/442* (2013.01); *C02F 1/444* (2013.01); *C02F 1/52* (2013.01); *C02F 1/66* (2013.01); *C02F 5/00* (2013.01); *C02F 11/122* (2013.01); *C02F 2101/10* (2013.01); *C02F 2101/105* (2013.01); *C02F 2103/10* (2013.01); *C02F 2209/06* (2013.01); *C02F 2303/16* (2013.01)

(56) References Cited

FOREIGN PATENT DOCUMENTS

| | | | |
|---|---|---|---|
| CN | 205045862 U | * | 2/2016 |
| CN | 105621772 A | | 6/2016 |
| CN | 205420043 U | | 8/2016 |
| CN | 106242132 A | | 12/2016 |
| CN | 106430771 A | | 2/2017 |
| CN | 106673277 A | | 5/2017 |
| CN | 107915360 A | | 4/2018 |
| CN | 207276369 U | | 4/2018 |
| CN | 207330611 U | | 5/2018 |
| CN | 105621769 B | | 8/2018 |
| CN | 108423907 A | * | 8/2018 |
| CN | 209242891 U | * | 8/2019 |
| CN | 110330160 A | | 10/2019 |
| CN | 110467301 A | | 11/2019 |
| CN | 110508591 A | | 11/2019 |
| CN | 111253032 A | | 6/2020 |
| CN | 210825679 U | * | 6/2020 |
| RU | 2737773 C1 | | 12/2020 |

OTHER PUBLICATIONS

Liu, Fu, et al. "Progress in the production and modification of PVDF membranes." Journal of membrane science 375.1-2 (2011): 1-27. (Year: 2011).*
Zhang et al—CN 107915360 A machine translation—Apr. 17, 2018 (Year: 2018).*
Li et al—CN 106430771 A machine translation—Feb. 22, 2017 (Year: 2017).*
CN-209242891-U machine translation (Year: 2019).*
CN-205045862-U machine translation (Year: 2016).*
CN-210825679-U machine translation (Year: 2020).*
CN-108423907-A machine translation (Year: 2018).*

* cited by examiner

WASTEWATER TREATMENT EQUIPMENT AND TREATMENT METHOD THEREOF

The present application claims priority of Chinese Patent Application No. 202110127209.4 filed on Jan. 29, 2021, the present disclosure of which is incorporated herein by reference in its entirety as part of the present disclosure.

TECHNICAL FIELD

Embodiments of the present disclosure relate to a wastewater treatment equipment and a treatment method of a wastewater.

BACKGROUND

At present, reinjection is generally the final destination of oilfield wastewater in the process of oilfield exploitation. With the water content of produced fluid increasing, especially in some old oilfields, more and more oilfield wastewater cannot be treated. Some low permeability oilfields or ultra-low permeability oilfields face the problem that wastewater cannot be injected. In some newly developed oilfields, a large amount of fracturing backflow fluid and drilling wastewater will be produced during the exploitation. Since the facilities for oil exploitation are not yet perfect, the produced fracturing backflow fluid and the drilling wastewater are usually transported to other combined stations for treatment by pipelines or tankers before reinjection, which breaks the water balance of the original oilfield, and increases the burden of oilfield wastewater reinjection.

The composition of the oilfield wastewater is complicated and the oilfield wastewater comprises many additives and inorganic ions. The oilfield wastewater is not stable in terms of quality, and it is very difficult to treat the oilfield wastewater. With the enhancement of people's awareness of environmental protection, researchers pay more and more attention to how to treat excess of oilfield wastewater without polluting the environment. The discharge standard of wastewater treatment is becoming more and more strict in our country, and it is increasing from the national level to the local level. For example, some local governments have upgraded the requirements of national integrated wastewater discharge standard class A to quasi class IV water, which indicates that the discharge standards of the oilfield wastewater will also be increased. Therefore, there is an urgent requirement for an equipment or a method which can properly solve the problem of oilfield wastewater discharge or reuse.

SUMMARY

At least one embodiment of the present disclosure provides a wastewater treatment equipment, and the wastewater treatment equipment comprises: a microfiltration unit, configured to receive a wastewater and filter the wastewater to obtain a solution; a membrane salt separation unit, configured to receive the solution and separate monovalent ions and multivalent ions in the solution to obtain a first solution comprising the monovalent ions and a second solution comprising the multivalent ions; a first evaporative crystallization unit, configured to crystallize the first solution to form a monovalent salt; and a second evaporative crystallization unit, configured to crystallize the second solution to form a mixed salt; and the microfiltration unit is connected to the membrane salt separation unit, and the first evaporative crystallization unit and the second evaporative crystallization unit are both directly connected to the membrane salt separation unit.

For example, in the wastewater treatment equipment provided by at least one embodiment of the present disclosure, a pore size of any one of separation pores in the membrane salt separation unit is from 1 nm to 2 nm.

For example, the wastewater treatment equipment provided by at least one embodiment of the present disclosure, further comprises a membrane concentration unit located between the microfiltration unit and the membrane salt separation unit, in which the membrane concentration unit comprises a reverse osmosis membrane, and the membrane concentration unit is configured to increase concentration of the monovalent ions and concentration of the multivalent ions in the solution.

For example, the wastewater treatment equipment provided by at least one embodiment of the present disclosure, further comprises an intermediate pool, as well as a water inlet pipeline, a reactor, a settling tank, and a relay pool which are successively connected, and the relay pool is directly connected to the microfiltration unit; and the intermediate pool is located between the microfiltration unit and the membrane concentration unit.

For example, in the wastewater treatment equipment provided by at least one embodiment of the present disclosure, the reactor comprises a tubular reactor, and the tubular reactor comprises a plurality of feeding ports arranged in sequence along a flow direction of the wastewater in the tubular reactor.

For example, in the wastewater treatment equipment provided by at least one embodiment of the present disclosure, the plurality of the feeding ports comprise a first feeding port, a second feeding port, a third feeding port, a fourth feeding port, a fifth feeding port, a sixth feeding port, and a seventh feeding port, and the first feeding port, the second feeding port, the third feeding port, the fourth feeding port, the fifth feeding port, the sixth feeding port and the seventh feeding port are configured to apply a demulsifier, a gel breaker, NaOH, a coagulant, $Na_2CO_3$, a silica removing agent and a flocculant, respectively.

For example, in the wastewater treatment equipment provided by at least one embodiment of the present disclosure, a pressure pump is arranged between the membrane concentration unit and the membrane salt separation unit.

For example, the wastewater treatment equipment provided by at least one embodiment of the present disclosure, further comprises a clean water tank, in which a clean water pipe of the first evaporative crystallization unit, a clean water pipe of the second evaporative crystallization unit and a clean water pipe of the membrane concentration unit are all connected with the clean water tank.

For example, in the wastewater treatment equipment provided by at least one embodiment of the present disclosure, each of the first evaporative crystallization unit and the second evaporative crystallization unit is one of a multiple effect evaporator, a mechanical vapor compression evaporator and a mechanical vapor recompression evaporator.

For example, in the wastewater treatment equipment provided by at least one embodiment of the present disclosure, the microfiltration unit is made from a sintered polyvinylidene fluoride, and a pore size of any one of separation pores in the microfiltration unit is from 0.02 μm to 0.5 μm.

For example, in the wastewater treatment equipment provided by at least one embodiment of the present disclosure, the wastewater treatment equipment comprises an oilfield wastewater treatment equipment.

For example, in the wastewater treatment equipment provided by at least one embodiment of the present disclosure, a top of the settling tank is provided with a water inlet pipe, a water outlet pipe, and an oil collecting pipe; a center of the settling tank is provided with a draft tube, a bottom of the settling tank is provided with a cross sludge discharge pipe, and a position of the oil collecting pipe is more than one meter higher than a position of the water outlet pipe.

For example, in the wastewater treatment equipment provided by at least one embodiment of the present disclosure, the relay pool is provided with a liquid agent dosing port and an online pH meter with remote communication function.

For example, the wastewater treatment equipment provided by at least one embodiment of the present disclosure, further comprises a sludge dewatering device, in which the settling tank and the relay pool are connected to the sludge dewatering device by screw pumps respectively.

For example, in the wastewater treatment equipment provided by at least one embodiment of the present disclosure, the sludge dewatering device comprises a plate-and-frame filter press machine or a coiled sludge dewatering machine.

At least one embodiment of the present disclosure further provides a treatment method of a wastewater, and the treatment method comprises: filtering the wastewater to obtain a solution; separating monovalent ions and multivalent ions in the solution to obtain a first solution comprising the monovalent ions and a second solution comprising the multivalent ions; crystallizing the first solution to form a monovalent salt; and crystallizing the second solution to form a mixed salt.

For example, the treatment method provided by at least one embodiment of the present disclosure, after the filtering the wastewater and before the separating the monovalent ions and the multivalent ions in the solution, the treatment method further comprises: concentrating the solution to increase concentration of the monovalent ions and concentration of the multivalent ions.

For example, the treatment method provided by at least one embodiment of the present disclosure, before the filtering the wastewater, the treatment method further comprises: a pretreatment step, in which the pretreatment step comprises: adding a demulsifier, a gel breaker, NaOH, a coagulant, $Na_2CO_3$, a silica removing agent and a flocculant into a raw wastewater in sequence so as to perform demulsification, gel breaking, pH adjustment, coagulation, softening, desilication, and flocculation reaction in sequence, followed by settling and concentrating steps.

For example, in the treatment method provided by at least one embodiment of the present disclosure, the settling and the concentrating steps are performed in a settling tank and a relay pool, respectively, and the treatment method further comprises: pumping the sludge in the relay pool and the sludge in the settling tank into a sludge dewatering device.

For example, in the treatment method provided by at least one embodiment of the present disclosure, the wastewater is filtered in the microfiltration unit to obtain the solution, and the treatment method further comprises: cleaning the microfiltration unit by using powdered activated carbon.

For example, in the treatment method provided by at least one embodiment of the present disclosure, the powdered activated carbon has a particle size of 100 mesh to 200 mesh.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
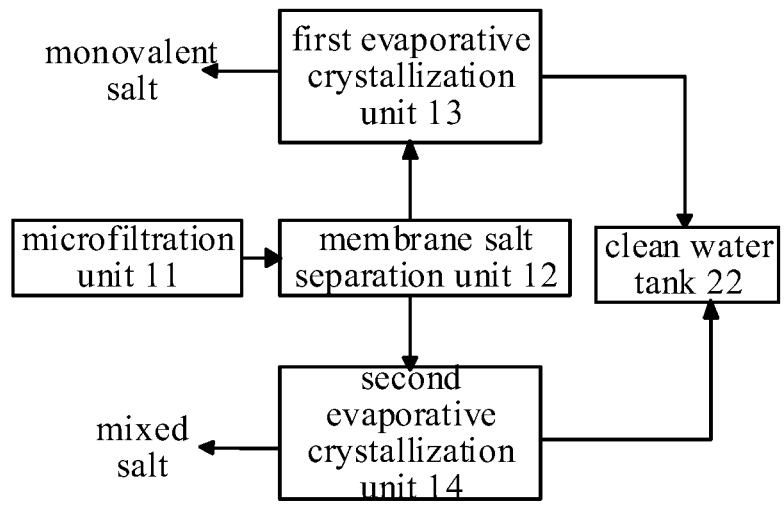
FIG. 1 is a structural block diagram of a wastewater treatment equipment provided by at least one embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "right," "left" and the like are only used to indicate relative position relationship, and in a case that the position of an object is described as being changed, the relative position relationship may be changed accordingly.

At present, technologies for wastewater treatment to meet the discharge standards mainly comprise pretreatment, multi-stage oxidation, electrodialysis, electrocoagulation and so on. The above processes have good removal effect on organic pollutants such as chemical oxygen demand (COD), and enable the treated wastewater to meet the discharge standards. However, the use of the above technologies will result in problems of complex process, high failure rate of equipment, large dosage, no desalination or only partial desalination discharge and partial reinjection. If wastewater is directly discharged to the earth's surface or water body without desalination treatment, it will lead to salinization of soil or water body, thereby destroying the ecological balance of the earth's surface or water body.

For example, in the existing wastewater treatment equipments and methods, some do not consider the technical solutions involving rough filtration of wastewater to remove hardness and silicon, while the hardness of the wastewater and the existence of silicon in the wastewater are the main reasons for the fouling of a ceramic membrane, a reverse osmosis membrane, a microfiltration membrane or a nanofiltration membrane. If the ceramic membrane is frequently subjected to acid washing and base washing, the whole wastewater treatment equipment will be shut down for a long time, thereby causing waste of chemicals. Although the ceramic membrane has a good retention capacity, it exhibits high brittleness and low toughness, and it is easy to be damaged during production, transportation and installation. The reverse osmosis membrane, the microfiltration membrane, or the nanofiltration membrane is generally formed by organic material. If the reverse osmosis membrane, the microfiltration membrane, and the nanofiltration membrane are washed frequently, the service life of the reverse osmosis membrane, the service life of the microfiltration membrane, or the service life of the nanofiltration membrane will be substantially affected. Moreover, the concentrated high-hardness oilfield wastewater entering into the evaporative crystallization unit is easy to cause problems including scaling, heat transfer efficiency decline and uneven heat transfer to the evaporative crystallization unit, and serious safety risks will occur. Moreover, the evaporative crystallization unit can only produce a mixed salt, and the disposal cost of the mixed salt is up to 5000 CNY/ton, thereby causing low economic benefit. Therefore, there is an urgent need for an equipment and method which is easy to achieve and can run continuously and smoothly, and can maximize the economic benefits, to achieve the standard discharge of wastewater.

Figure 3:
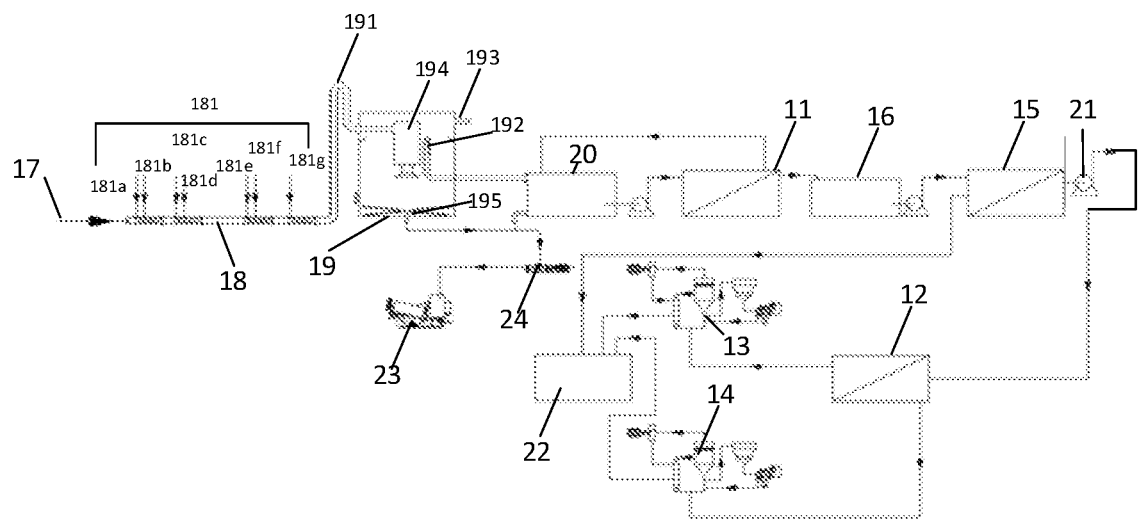
FIG. 3 is a schematic structural view of a wastewater treatment equipment provided by at least one embodiment of the present disclosure.

At least one embodiment of the present disclosure provides a wastewater treatment equipment. For example, FIG. 1 is a structural block diagram of a wastewater treatment equipment provided by at least one embodiment of the present disclosure; and FIG. 3 is a schematic structural view of a wastewater treatment equipment provided by at least one embodiment of the present disclosure. As shown in FIG. 1 and FIG. 3, the wastewater treatment equipment 10 comprises: a microfiltration unit 11 configured to receive a wastewater and filter the wastewater to obtain a solution; a membrane salt separation unit 12 configured to receive the solution and separate monovalent ions and multivalent ions in the solution to obtain a first solution comprising the monovalent ions and a second solution comprising the multivalent ions; a first evaporative crystallization unit 13 configured to crystallize the first solution to form a monovalent salt; and a second evaporative crystallization unit 14, configured to crystallize the second solution to form a mixed salt, and the microfiltration unit 11 is connected to the membrane salt separation unit 12, and the first evaporative crystallization unit 13 and the second evaporative crystallization unit 14 are both directly connected to the membrane salt separation unit 12. The wastewater treatment equipment provided in at least an embodiment of the present disclosure can achieve the standard discharge treatment of wastewater and fine salt separation, while the structure of the equipment is simplified, the operation cost is reduced, and the investment cost is reduced.

For example, the microfiltration unit 11 is made from a sintered material of polyvinylidene fluoride (PVDF). The microfiltration unit made from the sintered PVDF material has superior acid and base resistance and good friction resistance, and a silt density index (SDI) of the microfiltration unit is less than 0.5NTU. The microfiltration unit made from the sintered PVDF material has the characteristics of high filtration precision, and the filtration form of the microfiltration unit 11 is cross flow filtration, which can remove visible impurities from the wastewater to clarify the water, to reduce the hardness of the wastewater, and to concentrate the sludge in the wastewater.

For example, the microfiltration unit made from the sintered PVDF material makes up for the disadvantage of low toughness of the conventional ceramic membranes.

For example, a pore size of a filter membrane in the microfiltration unit made from the sintered PVDF material is from 0.02 µm to 0.5 µm. For example, the pore size of the filter membrane in the microfiltration unit is 0.02 µm, 0.04 µm, 0.05 µm, 0.1 µm, 0.15 µm, 0.2 µm, 0.25 µm, 0.3 µm, 0.35 µm, 0.4 µm, 0.45 µm or 0.5 µm.

For example, in an example, the pore size of the filter membrane in the microfiltration unit 11 is 0.1 µm, and a microfiltration flux of the microfiltration unit 11 is 300 L/m²·h to 500 L/m²·h.

For example, in another example, the pore size of the filter membrane in the microfiltration unit 11 is 0.3 µm, and the microfiltration flux of the microfiltration unit 11 is 450 L/m² to 600 L/m²·h.

For example, at a constant microfiltration flux, the operating pressure of the microfiltration unit 11 increases gradually with the progression of the microfiltration process, and the difference of operating pressures on two sides of the membrane in the microfiltration unit 11 is 0.5 bar to 1.5 bar.

For example, the microfiltration unit 11 allows macromolecular organics and soluble inorganic salts to pass through, but it can prevent suspended solids, bacteria, some viruses and large-scale colloids from passing through. The solution filtered by the microfiltration unit 11 only contains invisible substances. After treatment by the microfiltration unit 11, the effluent hardness of the wastewater is less than 90 mg/L.

For example, after the microfiltration unit 11 has been running for a long term, some colloids will adhere to the microfiltration unit 11, which results in a decrease of the flux of the microfiltration unit 11. Powdered activated carbon can be used to clean the filter membrane in the microfiltration unit 11, so as to play a role of cleaning and delaying the fouling of the microfiltration unit 11, thereby reducing the amount of cleaning agents and water during the operation of the microfiltration unit 11.

For example, the powdered activated carbon has a particle size of 100 mesh to 200 mesh, and the powdered activated carbon can be directly added into a vessel within which the microfiltration unit is located.

It should be noted that, before the microfiltration unit is used to filter the wastewater, appropriate chemicals can be added to the wastewater to produce precipitations so as to remove silicon and hardness. Then, a part of the precipitations is removed by sedimentation to reduce the treating load of the microfiltration unit.

For example, the microfiltration unit 11 being connected to the membrane salt separation unit 12 means that the membrane salt separation unit 12 can directly receive the solution filtered by the microfiltration unit 11. Alternatively, other components, for example, a membrane concentration unit 15 as mentioned below, can be disposed between the microfiltration unit 11 and the membrane salt separation unit 12.

For example, the membrane salt separation unit 12 is a disk tube nanofiltration membrane (DTNF) with an operating pressure of 90 bar to 120 bar, e.g., 90 bar, 100 bar, 110 bar or 120 bar.

For example, a pore size of each of the separation pores in the membrane salt separation unit 12 is from 1 nm to 2 nm, for example, 1.1 nm, 1.2 nm, 1.4 nm, 1.5 nm, 1.6 nm, 1.8 nm, 1.9 nm or 2 nm.

For example, the membrane salt separation unit 12 is configured to receive the solution filtered by the microfiltration unit 11 and separating the monovalent ions and the multivalent ions in the solution to obtain the first solution comprising the monovalent ions and a second solution comprising the multivalent ions. Since a particle size of the monovalent ions is less than that of the multivalent ions, the particle size of the monovalent ions is less than 1 nm and the particle size of the multivalent ions is greater than 2 nm, the monovalent ions and the multivalent ions are separably disposed on two sides of the membrane salt separation unit 12, so that they are separated by the membrane salt separation unit 12.

For example, the monovalent ions comprise sodium ions ($Na^+$), chloride ions ($Cl^-$) or potassium ions ($K^+$), or the like.

For example, the multivalent ions comprise sulfate ions ($SO_4^{2-}$), carbonate ions ($CO_3^{2-}$), magnesium ions ($Mg^{2+}$), calcium ions ($Ca^{2+}$) or phosphate ions ($PO_4^{3-}$), or the like.

For example, the wastewater treatment equipment 10 further comprises a first evaporative crystallization unit 13 and a second evaporative crystallization unit 14, the first evaporative crystallization unit 13 and the second evaporative crystallization unit 14 are both directly connected to the membrane salt separation unit 12, the first evaporative crystallization unit 13 is configured to crystallize the first solution to form a monovalent salt, and the second evaporative crystallization unit 14 is configured to crystallize the second solution to form a mixed salt. Moreover, the first evaporative crystallization unit 13 and the second evaporative crystallization unit 14 are directly connected to the same membrane salt separation unit 12, which simplifies the structure of the wastewater treatment equipment in the premise of ensuring a precise salt separation and enabling the effluent wastewater to satisfy the discharge standards, thus, the operation cost is greatly reduced, and the investment cost is reduced.

It should be noted that, the first evaporative crystallization unit 13 and the second evaporative crystallization unit 14 being both directly connected to the membrane salt separation unit 1 means that the first solution obtained in the membrane salt separation unit 12 directly passes to the first evaporative crystallization unit 13, there is no additional processing unit between the membrane salt separation unit 12 and the first evaporative crystallization unit 13, and the first solution does not enter any other processing unit before entering the first evaporative crystallization unit 13; and the second solution obtained in the membrane salt separation unit 12 directly passes to the second evaporative crystallization unit 14, there is no additional processing unit between the membrane salt separation unit 12 and the second evaporative crystallization unit 14, and the second solution does not enter any other processing unit before passing to the second evaporative crystallization unit 14. For example, the above mentioned other processing units comprise a filtration unit, a dilution unit, a concentration unit, and so on.

For example, the first evaporative crystallization unit 13 being directly connected to the membrane salt separation unit 12 does not exclude that any necessary components such as tubes, valves, containers, detection units, and the like are disposed between the first evaporative crystallization unit 13 and the membrane salt separation unit 12; and the second evaporative crystallization unit 14 being directly connected to the membrane salt separation unit 12 does not exclude that any necessary components such as tubes, valves, containers, detection units, and the like are disposed between the second evaporative crystallization unit 14 and the membrane salt separation unit 12.

For example, in the first evaporative crystallization unit 13 and the second evaporative crystallization unit 14, evaporation heat source is used to heat the first solution and the second solution, respectively, so that the first solution and the second solution change from an unsaturated state to a saturated state respectively. As the evaporation proceeds, the excess solute precipitates as crystal to form the monovalent salt and the mixed salt. For example, the evaporation heat source is waste steam.

For example, in some embodiments, the wastewater treatment equipment 10 is an oilfield wastewater treatment equipment. Generally, in oilfield wastewater, the monovalent ions include sodium ions ($Na^+$), chloride ions ($Cl^-$), potassium ions ($K^+$), and a molar ratio of the sodium ions ($Na^+$) to the potassium ions ($K^+$) is 5.5:1 to 7.5:1. According to the difference of solubility of sodium chloride and solubility of potassium chloride, with the change of temperature, the solubility of the sodium chloride varies slightly, but the solubility of the potassium chloride varies quite significantly. A solution containing the sodium chloride and the potassium chloride can be heated and concentrated to a saturated state to form a saturated solution, and then cooled to precipitate the potassium chloride. At this time, the sodium chloride is not yet saturated to precipitate. The raw wastewater is subjected to centrifugation, and then the formed solution is returned to the first evaporative crystallization unit. When the sodium chloride reaches a certain concentration in the raw wastewater, the sodium chloride precipitates in an evaporation section. In this way, the sodium chloride (NaCl) formed by evaporation crystallization can be recycled and reused as an industrial salt, and the potassium chloride can be used to formulate oilfield drilling fluid to achieve resource utilization.

For example, the oilfield wastewater usually comprises little phosphate ions ($PO_4^{3-}$) and little carbonate ions ($CO_3^{2-}$), and thus the mixed salt formed by subsequent evaporation crystallization mainly comprises calcium sulfate ($CaSO_4$) and magnesium sulfate ($MgSO_4$).

For example, after the water evaporated in the first evaporative crystallization unit 13 and the second evaporative crystallization unit 14 being condensed, the water enters to a clean water tank, so that the final discharge wastewater reaches the discharge standard.

For example, the first evaporative crystallization unit 13 and the second evaporative crystallization unit 14 are both one of a multiple effect evaporator, a mechanical vapor compression evaporator and a mechanical vapor recompression evaporator.

The wastewater treatment equipments provided in the embodiments of the present disclosure are suitable for treating the oilfield wastewater, which is not limited to this. The wastewater treatment equipments can also be used to treat other wastewater other than the oilfield wastewater.

Figure 2:
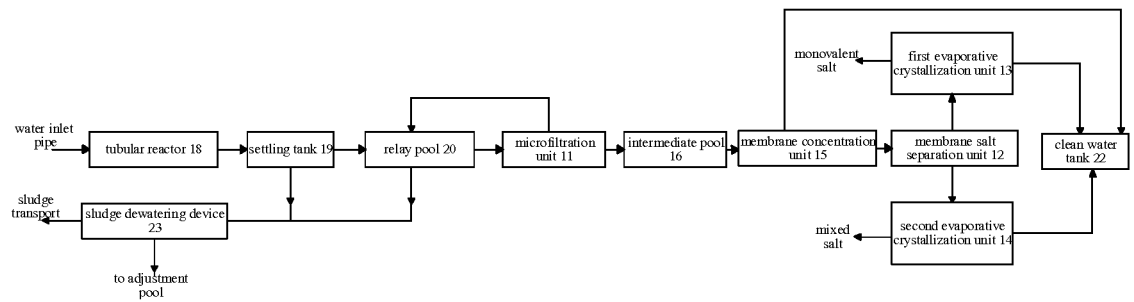
FIG. 2 is a structural block diagram of another wastewater treatment equipment provided by at least one embodiment of the present disclosure.

For example, FIG. 2 is a structural block diagram of another wastewater treatment equipment provided by at least one embodiment of the present disclosure. As shown in FIG. 2 and FIG. 3, the wastewater treatment equipment 10 further comprises a membrane concentration unit 15 located between the microfiltration unit 11 and the membrane salt separation unit 12, the membrane concentration unit 15 comprises a reverse osmosis membrane, and the membrane concentration unit 15 is configured to increase concentration of the monovalent ions and concentration of the multivalent ions in the solution. Thus, the solution is concentrated in the membrane concentration unit 15; then concentrated effluent enters the membrane salt separation unit, and the membrane salt separation unit separates the monovalent ions from the multivalent ions, thus, the amount of the first solution subsequently entering the first evaporative crystallization unit 13 and the amount of the second solution subsequently entering the second evaporative crystallization unit 14 are greatly reduced, and further the investment of cleaning, repairing and replacing the first evaporative crystallization unit 13 and the second evaporative crystallization unit 14 is reduced. Since the first evaporative crystallization unit 13 and the second evaporative crystallization unit 14 account for more than 60% of a total cost of the whole wastewater treatment equipment 10, the investment of the whole wastewater treatment equipment 10 is finally significantly reduced.

For example, an operating temperature of the membrane concentration unit 12 is 40 bar to 60 bar, for example, 40 bar, 50 bar or 60 bar.

For example, a pressure pump 21 is arranged between the membrane concentration unit 15 and the membrane salt separation unit 12, so that the concentrated wastewater produced by the membrane concentration unit 15 is connected to the membrane salt separation unit 12 by the pressure pump 21.

For example, the membrane concentration unit 15 is a dish tube reverse osmosis (DTRO) membrane, which is a type of a reverse osmosis membrane, and can be used to treat high concentration wastewater, and its core technology is a dish tube membrane and column. A reverse osmosis membrane and a hydraulic guide plate are stacked together, and are fixed by a central rod and an end plate, and then are inserted into a pressure casing to form a membrane column. As compared with a conventional reverse osmosis membrane, the dish tube reverse osmosis membrane has the following advantages: a dish tube reverse osmosis membrane assembly adopts an open flow channel design, which widens an effective flow channel of wastewater, thereby reducing the physical blockage. The dish tube reverse osmosis membrane assembly adopts a guide plate with convex point support, and thus the wastewater forms a turbulent state during the filtration process, which reduces the fouling, pollution and concentration polarization on a membrane surface to the greatest extent. The application of the dish tube reverse osmosis membrane assembly can effectively reduce the membrane fouling, reduce the membrane pollution, and prolong the cleaning cycle. In addition, the dish tube reverse osmosis membrane assembly is easy to clean and has good flux recovery after cleaning, thereby prolonging the service life of the dish tube reverse osmosis membrane.

For example, as shown in FIG. 2 and FIG. 3, the wastewater treatment equipment 10 further comprises a clean water tank 22. A clean water pipe of the first evaporative crystallization unit 13, a clean water pipe of the second evaporative crystallization unit 14 and a clean water pipe of the membrane concentration unit 15 are all connected with the clean water tank 22, so that the effluent water produced by crystallization or the concentrated effluent water is discharged into the clean water tank 22.

For example, after the first solution is treated by the first evaporative crystallization unit 13, the recovery rate of the condensed water is greater than 65%; and after the second solution is treated by the second evaporative crystallization unit 14, the recovery rate of the condensed water is greater than 65%.

For example, as shown in FIG. 2 and FIG. 3, the wastewater treatment equipment further comprises: an intermediate pool 16 between the microfiltration unit 11 and the membrane concentration unit 15, as well as a water inlet pipeline 17, a reactor 18, a settling tank 19 and a relay pool 20 which are successively connected, and the relay pool 20 is directly connected to the microfiltration unit 11. For example, the wastewater treatment equipment is an oilfield wastewater treatment equipment.

For example, the relay pool 20 being directly connected to the microfiltration unit 11 does not exclude that any necessary components such as tubes, valves, containers, detection units, and the like are disposed between the relay pool 20 and the microfiltration unit 11.

For example, as shown in FIG. 3, the water inlet pipeline 17 is used to feed the raw wastewater into the wastewater treatment equipment.

For example, as shown in FIG. 3, the reactor 18 is a tubular reactor. For example, the tubular reactor is a tube-shaped, continuous operation reactor with a large aspect ratio, which belongs to a plug flow reactor. The tubular reactor has a small backmixing.

For example, along the flow direction of the wastewater in the tubular reactor 18, the tubular reactor 18 comprises a plurality of feeding ports 181 arranged in sequence.

For example, the plurality of the feeding ports 181 comprise a first feeding port 181a, a second feeding port 181b, a third feeding port 181c, a fourth feeding port 181d, a fifth feeding port 181e, a sixth feeding port 181f and a seventh feeding port 181g. For example, in an embodiment, it is feasible to apply a demulsifier to the first feeding port 181a, apply a gel breaker to the second feeding port 181b, apply NaOH to the third feeding port 181c, apply a coagulant to the fourth feeding port 181d, apply $Na_2CO_3$ to the fifth feeding port 181e, apply a silica removing agent to the sixth feeding port 181f, and apply a flocculant to the seventh feeding port 181g.

For example, as the raw wastewater proceeds in the tubular reactor, the corresponding agents are added to the feeding ports of the tubular reactor, so that pH adjustment, coagulation, softening, silica removal, and flocculation reaction are performed in sequences in the tubular reactor 18. Oilfield wastewater carries a large number of dissolved salts, petroleum hydrocarbons, sediment, mechanical impurities, various oil production additives and other pollutants. It has the characteristics of high salt content, high chemical oxygen demand (COD) content and high hardness, and so on, and it is usually necessary to carry out appropriate pretreatment before using membrane separation technology for advanced treatment.

For example, adding the demulsifier into the raw wastewater enables the emulsified oil and partially dissolved oil to aggregate to form a floating oil. After settling, the COD value of the wastewater is significantly reduced. For example, the dosage of the demulsifier is 20 mg/L to 200 mg/L, and the dosage of the gel breaker is 200 mg/L to 400 mg/L. For example, the gel breaker can only be dosed when treating the oilfield wastewater containing the fracturing flowback fluid.

For example, NaOH is added to adjust the pH of the raw wastewater to 8.5 to 9.0 so that the subsequent treatment is performed in a basic environment.

For example, the dosage of the coagulant is 60 mg/L to 300 mg/L. The coagulant can play a role of absorption bridging so that the colloidal particles in the raw wastewater are bonded and agglomerated to larger particles to finally form precipitations. Common coagulants comprise polyaluminum chloride (PAC).

For example, adding $Na_2CO_3$ into the reactor can adjust the pH of the raw wastewater to 10.0 to 10.5, and remove most of iron ions and hardness ions including magnesium ions, calcium ions, barium ions, strontium ions from the raw wastewater. Because the microfiltration unit is unable to filter hardness ions, filtering hardness ions as described above can prevent the decrease of flux of the microfiltration unit 11 caused by scaling of the ions. For example, the softening of the raw wastewater can prevent the membrane concentration unit 15 and the membrane salt separation unit 12 from scaling and membrane damaging caused by repeated cleaning during the concentration process of materials.

For example, magnesium oxide is added into the reactor for removing silica.

For example, adding the flocculant into the reactor can destroy the stability of the colloid, so that the colloid and suspended fine solids in the raw wastewater aggregate to floc with separable characteristic which are subsequently separated and removed. Common used flocculants comprise inorganic salts, such as, aluminum sulfate, aluminum chloride, ferric sulfate, ferric chloride, and other inorganic salts, or polyacrylamide (PAM) and other organic compounds.

For example, the plurality of the feeding ports 181 can also be four feeding ports. The demulsifier and the gel breaker share a same feeding port; NaOH and the coagulant share a same feeding port, the silica removing agent and $Na_2CO_3$ share a same feeding port; and the flocculant alone uses one feeding port, so that the number of the feeding ports of the reactor can be reduced and the cost of the reactor can be reduced.

For example, by completing the chemical reactions in the tubular reactor, the complex reaction steps are reduced, the energy consumption is reduced, and the floor area of the equipment is reduced. In addition, agents with similar properties can be added into the same feeding port of the feeding ports, thereby reducing the number of the feeding ports of the tubular reactor.

Figure 4:
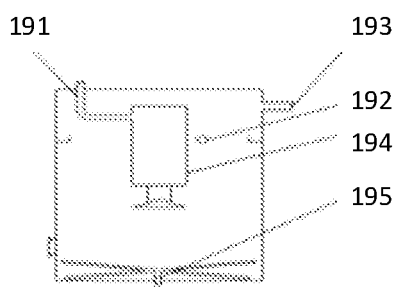
FIG. 4 is a schematic structural view of a settling tank in a wastewater treatment equipment provided by at least one embodiment of the present disclosure.

For example, FIG. 4 is a schematic structural view of a settling tank in a wastewater treatment equipment provided by at least one embodiment of the present disclosure. As shown in FIG. 4, the settling tank 19 comprises a water inlet pipe 191, a water outlet pipe 192, and an oil collecting pipe 193 disposed at the top of the settling tank; a draft tube 194 is disposed in the center of the settling tank 19; and a cross sludge discharge pipe 195 is disposed at the bottom of the settling tank 19. Since the density of oil is less than the density of water, it is required to dispose the oil collecting pipe 193 above the water outlet pipe. For example, in an example, a position of the oil collecting pipe 193 is more than one meter higher than a position of the water outlet pipe 192.

For example, the raw wastewater discharged from the reactor passes to the water inlet pipe 191 and enters the draft tube 194 of the settling tank 19. The raw wastewater comprises a lot of precipitates, the precipitates carrying part of the aged oil settles to the cross sludge discharge pipe 195 at the bottom of the settling tank. By adding appropriate agents into the settling tank, the oil in the raw wastewater can float onto the top of the raw wastewater under the action of gravity. After the suspended oil accumulates to an extent, the liquid level of the raw wastewater can be increased by controlling a valve in the water outlet pipe so as to discharge the oil. Then, the oil can be collected from the oil collecting pipe 193, thereby creating additional economic benefits.

For example, the settling tank 19 is a main place where the wastewater undergoes precipitations by concentration, demulsification, hardness removal, silica removal, and suspended solid removal by flocculation. The raw wastewater undergoes solid-liquid separation in the settling tank with a residence time of 4 to 6 hours. According to the status of the raw wastewater, the oil is periodically collected. After the raw wastewater is purified in the settling tank, the load of the subsequent microfiltration unit, the load of the membrane concentration unit and the load of the membrane salt separation are reduced, and further it can effectively reduce the harm of silica scale and hardness substances to the subsequent microfiltration unit, the membrane concentration unit, the membrane salt separation unit, the first evaporative crystallization unit and the second evaporative crystallization unit, so that the microfiltration unit, the membrane concentration unit and the membrane salt separation unit can operate at a higher membrane flux, thereby reducing the consumption of acid, the consumption of base, and the consumption of clean water during backwashing, and prolonging the maintenance and repair cycles and the service life of all of the microfiltration unit, the membrane concentration unit, the membrane salt separation unit, the first evaporative crystallization unit and the second evaporative crystallization unit.

For example, after the raw wastewater being settled in the settling tank 19, the raw wastewater overflows from the water outlet pipe 192 and enters the relay pool 20; the raw wastewater in the relay pool 20 is fed into the microfiltration unit 11 by the way of pressurization by the pressurization pump; the microfiltration unit 11 returns the concentrated wastewater produced by filtering the raw wastewater to the relay pool 20; and the microfiltration unit 11 passes the clean water produced by filtering the raw wastewater to the intermediate pool 16.

For example, powdered activated carbon is added into the relay pool 20, followed by passing the powdered activated carbon to the microfiltration unit 11 with the raw wastewater, and then the activated carbon returns to the relay pool 20 with the concentrated water. The powdered activated carbon circulates between the microfiltration unit 11 and the relay pool 20 to repeatedly clean the microfiltration unit 11, thereby maintaining the flux of the microfiltration unit 11.

For example, the relay pool 20 is provided with a liquid agent dosing port and an online pH meter with remote communication function. By adding liquid agent(s) into the relay pool 20, the acid-base property of the raw wastewater in the relay pool 20 can be adjusted. The online pH meter with remote communication function can provide a real-time feedback of pH of the raw wastewater in the relay pool 20.

For example, the wastewater treatment equipment 10 further comprises a sludge dewatering device 23. The sludge in the settling tank 19 and the sludge in the relay pool 20 are required to discharge regularly. The settling tank 19 and the relay pool 20 are connected to the sludge dewatering device 23 by screw pumps 24 respectively to realize the regular sludge discharge. The water content of the dewatered wastewater reaches 65% to 85%, and then the sludge is transported to the a designated place.

For example, the sludge dewatering device 23 is a plate-and-frame filter press machine or a coiled sludge dewatering machine.

For example, the wastewater treatment equipment can realize the discharge of wastewater up to the standard, to solve the existing problems of inability of wastewater desalination, limited wastewater discharge, large produce of mixed salt, long technical process, and unstable operation of the wastewater treatment equipment.

Figure 5:
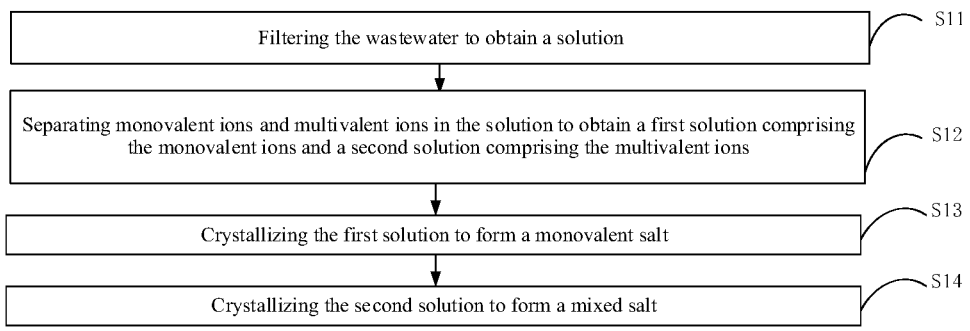
FIG. 5 is a schematic process flowchart of a wastewater treatment method provided by at least one embodiment of the present disclosure.

At least one embodiment of the present disclosure further provides a treatment method of a wastewater. For example, FIG. 5 is a schematic process flowchart of a wastewater treatment method provided by at least one embodiment of the present disclosure. As shown in FIG. 5, the treatment method of the wastewater comprises:

S11: Filtering the wastewater to obtain a solution.

For example, a microfiltration unit is used to receive and filter the wastewater to obtain a solution. The microfiltration unit is made from a sintered polyvinylidene fluoride (PVDF) material. The microfiltration unit made from the sintered PVDF material has superior acid and base resistance and strong friction resistance. The silt density index (SDI) value of the microfiltration unit is less than 0.5NTU. The microfiltration unit made from the sintered PVDF material has large channels which allow high solid load, and the filtration mode of the microfiltration unit is cross flow filtration. The microfiltration unit can remove visible impurities from the wastewater to clarity the water quality, to reduce the hardness of the wastewater, and to play a role of concentrating the sludge in the wastewater.

For example, a pore size of the filter membrane in the microfiltration unit made from the sintered PVDF material is from 0.02 μm to 0.5 μm. For example, the pore size of the filter membrane in the microfiltration unit is 0.02 μm, 0.04 μm, 0.05 μm, 0.1 μm, 0.15 μm, 0.2 μm, 0.25 μm, 0.3 μm, 0.35 μm, 0.4 μm, 0.45 μm or 0.5 μm.

For example, the pore size of the filter membrane in the microfiltration unit is 0.1 μm, and a microfiltration flux is 300 L/m²·h to 500 L/m²·h.

For example, the pore size of the filter membrane in the microfiltration unit is 0.3 μm, and the microfiltration flux is 450 L/m²·h to 600 L/m²·h.

For example, at a constant microfiltration flux, the operating pressure of the microfiltration unit increases gradually with the progression of the microfiltration process, and the difference of operating pressures on two sides of the membrane in the microfiltration unit 11 is 0.5 bar to 1.5 bar.

For example, the microfiltration unit allows macromolecular organics and soluble inorganic salts to pass through, but it can prevent suspended solids, bacteria, some viruses and large-scale colloids from passing through. The solution filtered by the microfiltration unit only contains invisible substances. After treatment by the microfiltration unit, the effluent hardness of the wastewater is less than 90 mg/L.

For example, after a long period of operation, some colloids adhere to the microfiltration unit, resulting in a decrease of the flux of the microfiltration unit. The powdered activated carbon can be used to clean the filter membrane in the microfiltration unit so as to play a role of cleaning and delaying the fouling of the microfiltration unit, thereby reducing the amount of the cleaning agents and cleaning water during the operation of the microfiltration unit. For example, the powdered activated carbon has a particle size of 100 mesh to 200 mesh, and the powdered activated carbon can be directly added into the vessel within which the microfiltration unit is located.

It should be noted that, before filtration of the wastewater in the microfiltration unit, appropriate chemicals can be added to the wastewater to produce precipitations, followed by removal of the precipitations in a manner of settling to remove silicon and hardness from the wastewater.

S12: Separating monovalent ions and multivalent ions in the solution to obtain a first solution comprising the monovalent ions and a second solution comprising the multivalent ions.

For example, a membrane salt separation unit is used to receive the solution filtered by the microfiltration unit, and the monovalent ions and the multivalent ions are separated to obtain the first solution comprising the monovalent ions and the second solution comprising the multivalent ions.

For example, the membrane salt separation unit is connected to the microfiltration unit used in the step S11. The membrane salt separation unit can directly receive the solution filtered by the microfiltration unit. Alternatively, other components can be disposed between the microfiltration unit and the membrane salt separation unit, for example, a membrane concentration unit and so on.

For example, the membrane salt separation unit is a disk tube nanofiltration membrane (DTNF) with an operating pressure of 90 bar to 120 bar, for example, 90 bar, 100 bar, 110 bar or 120 bar.

For example, the pore size of any one of the paration pores in the membrane salt separation unit is from 1 nm to 2 nm, for example, 1.1 nm, 1.2 nm, 1.4 nm, 1.5 nm, 1.6 nm, 1.8 nm, 1.9 nm or 2 nm.

For example, since the particle size of the monovalent ions is less than the particle size of the multivalent ions, the particle size of the monovalent ions is less than 1 nm and the particle size of the multivalent ions is greater than 2 nm, the monovalent ions and the multivalent ions are separably disposed on two sides of the membrane salt separation unit so that they are separated by the membrane salt separation unit.

For example, the monovalent ions comprise sodium ions ($Na^+$), chloride ions ($Cl^-$) or potassium ions ($K^+$), or the like.

For example, the multivalent ions comprise sulfate ions ($SO_4^{2-}$), carbonate ions ($CO_3^{2-}$), magnesium ions ($Mg^{2+}$), calcium ions ($Ca^{2+}$) or phosphate ions ($PO_4^{3-}$), or the like.

S13: Crystallizing the first solution to form a monovalent salt.

For example, a first evaporative crystallization unit is used to crystallize the first solution to form the monovalent salt, and the first evaporative crystallization unit is directly connected to the above mentioned membrane salt separation unit.

S14: Crystallizing the second solution to form a mixed salt.

For example, a second evaporative crystallization unit is used to crystallize the second solution to form the mixed salt, and the second evaporative crystallization unit is directly connected to the above mentioned membrane salt separation unit.

For example, the first solution treated by the membrane salt separation unit directly enters the first evaporative crystallization unit, and the second solution treated by the membrane salt separation unit directly enters the second evaporative crystallization unit, which can significantly reduce the operation and investment costs in the premise of ensuring a precise salt separation and enabling the effluent wastewater to satisfy the discharge standards.

The treatment method of the wastewater provided by the embodiments of the present disclosure is adapted to treat the oilfield wastewater, but not limited to this. It can also be used to treat other wastewater besides the oilfield wastewater.

Figure 6:
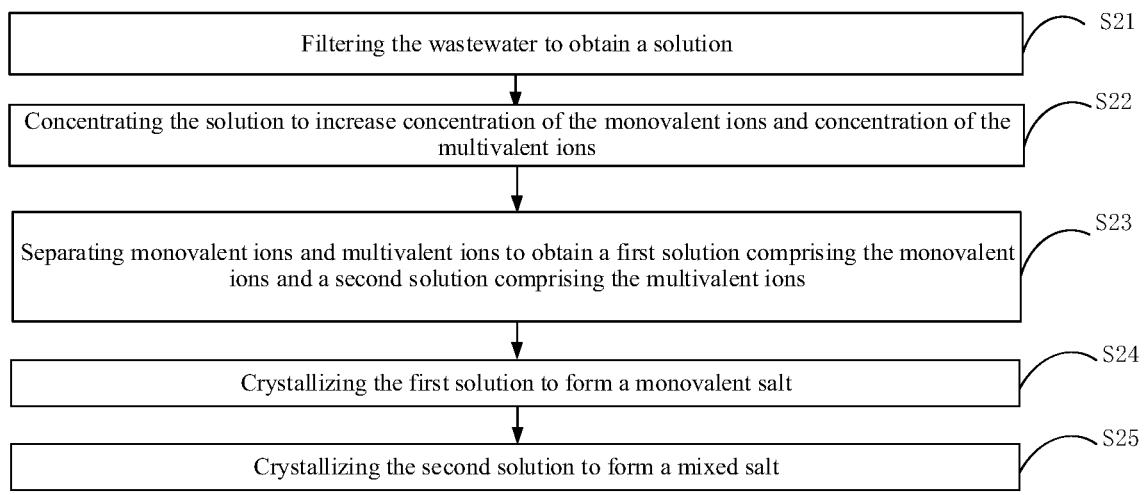
FIG. 6 is a schematic process flowchart of another wastewater treatment method provided by at least one embodiment of the present disclosure.

For example, in the embodiments of the present disclosure, after the filtering the wastewater and before the separating the monovalent ions and the multivalent ions in the solution, the treatment method further comprises: concentrating the solution to increase concentration of the monovalent ions and concentration of the multivalent ions. For example, FIG. 6 is a schematic process flowchart of another wastewater treatment method provided by at least one embodiment of the present disclosure. As shown in FIG. 6, the treatment method of the wastewater comprises:

S21: Filtering the wastewater to obtain a solution.

S22: Concentrating the solution to increase concentration of the monovalent ions and concentration of the multivalent ions.

For example, a membrane concentration unit is used to treat the solution to increase the concentration of the monovalent ions and the concentration of the multivalent ions in the solution. The membrane concentration unit is located between the microfiltration unit and the membrane salt separation unit, and the membrane concentration unit is a reverse osmosis membrane. Thus, the solution is concentrated by the membrane concentration unit, the concentrated effluent passes to the membrane salt separation unit where the monovalent ions and the multivalent ions are separated so as to dramatically reduce the fluid amount subsequently entering the first evaporation unit and the second evaporative crystallization unit, thereby reducing the investment for cleaning, repairing, and replacing the first evaporative crystallization unit and the second evaporative crystallization unit. That is, the solution is concentrated in the membrane concentration unit first; the concentrated effluent passes to the membrane salt separation unit for salt separation which can dramatically reduce the production of the concentrated wastewater, thereby reducing the investment of the subsequent first evaporative crystallization unit and the investment of the second evaporative crystallization unit.

For example, the operating pressure of the membrane concentration unit is 40 bar to 60 bar, for example, 40 bar, 50 bar or 60 bar.

For example, the solution is transported from the membrane concentration unit to the membrane salt separation unit by a pressure pump.

For example, the membrane concentration unit is a dish tube reverse osmosis (DTRO) membrane. The dish tube reverse osmosis membrane is a type of reverse osmosis membrane, and can be used to treat high concentration wastewater. The core technology of the dish tube reverse osmosis membrane is dish tube membrane and column. A reverse osmosis membrane and a hydraulic guide plate are stacked together, fixed with a central rod and an end plate, and then placed in a pressure casing to form a membrane column. As compared with conventional reverse osmosis membranes, the dish tube reverse osmosis membrane has the following advantages: the dish tube reverse osmosis membrane assembly adopts an open flow channel design, which widens the effective flow channel of the wastewater, thereby avoiding the physical blockage. The dish tube reverse osmosis membrane assembly adopts a guide plate with convex point support, and thus the wastewater forms the turbulent state during the filtration process, which reduces the fouling, pollution and concentration polarization on the membrane surface to the greatest extent. The use of the dish tube reverse osmosis membrane assembly can effectively reduce the membrane fouling, reduce the membrane pollution, and prolong the cleaning cycle. In addition, the dish tube reverse osmosis membrane assembly is easy to clean and has good flux recovery after cleaning, thereby prolonging the service life of the dish tube reverse osmosis membrane.

S23: Separating monovalent ions and multivalent ions to obtain a first solution comprising the monovalent ions and a second solution comprising the multivalent ions.

S24: Crystallizing the first solution to form a monovalent salt.

S25: Crystallizing the second solution to form a mixed salt.

For example, the treatment methods in the above mentioned steps S21, S23, S24 and S25 can refer to the relevant descriptions in the above mentioned S11 to S14, which are omitted herein.

Figure 7:
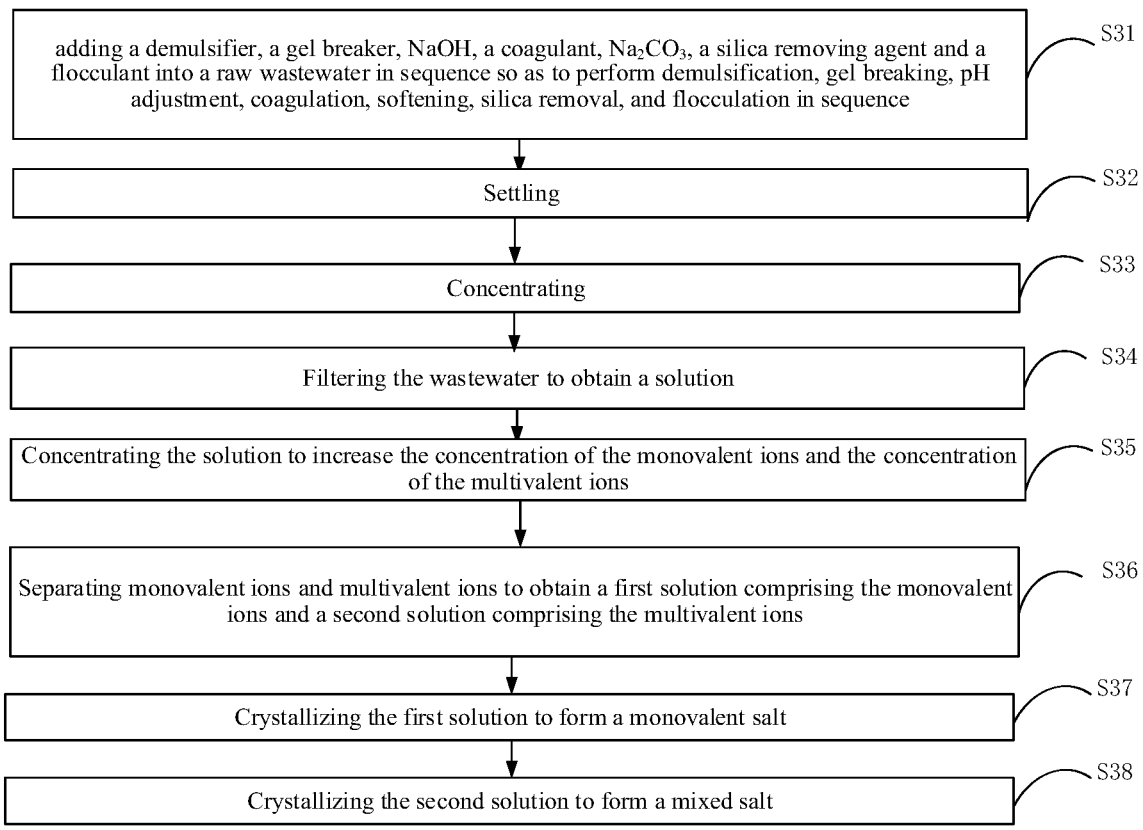
FIG. 7 is a schematic process flowchart of still another wastewater treatment method provided by at least one embodiment of the present disclosure.

For example, in the embodiments of the present disclosure, before the filtering the wastewater, the treatment method further comprises a pretreatment step, and the pretreatment step comprises: adding a demulsifier, a gel breaker, NaOH, a coagulant, $Na_2CO_3$, a silica removing agent and a flocculant into a raw wastewater in sequence so as to perform demulsification, gel breaking, pH adjustment, coagulation, softening, silica removal, and flocculation in sequence, followed by settling and concentrating steps. For example, FIG. 7 is a schematic process flowchart of still another wastewater treatment method provided by at least one embodiment of the present disclosure. As shown in FIG. 7, the treatment method of the wastewater comprises:

S31: adding a demulsifier, a gel breaker, NaOH, a coagulant, $Na_2CO_3$, a silica removing agent and a flocculant into a raw wastewater in sequence so as to perform demulsification, gel breaking, pH adjustment, coagulation, softening, silica removal, and flocculation in sequence.

For example, the raw wastewater passes through the water inlet pipeline and enters the reactor, and the reactor for example is a tubular reactor. The tubular reactor is a continuous operation reactor, which belongs to a plug flow reactor, and has a low backmixing. Along the flow direction of the wastewater in the tubular reactor, the tubular reactor comprises a plurality of feeding ports arranged in sequence.

For example, it is feasible to add the demulsifier to the first feeding port, add the gel breaker to the second feeding port, add the NaOH to the third feeding port, add the coagulant to the fourth feeding port, add the $Na_2CO_3$ to the fifth feeding port, add the silicon removing agent to the sixth feeding port, and add the flocculant to the seventh feeding port.

For example, with the flow of the raw wastewater in the tubular reactor, the corresponding reagents are added into the feeding ports of the tubular reactor, which makes that the tubular reactor successively undergo pH adjustment, coagulation, softening, desilication and flocculation reaction. Oilfield wastewater carries a large number of dissolved salts, petroleum hydrocarbons, sediment, mechanical impurities, various oil production additives and other pollutants. It has the characteristics of high salt content, high chemical oxygen demand (COD) content and high hardness, and is usually required to undergo appropriate pretreatment prior to advanced treatment by using the membrane separation technology.

For example, adding the demulsifier into the raw wastewater enables the emulsified oil and partially dissolved oil to aggregate to form a floating oil. After settling, the COD value of the wastewater is significantly reduced. For example, the dosage of the demulsifier is 20 mg/L to 200 mg/L, and the dosage of the gel breaker is 200 mg/L to 400 mg/L. For example, the gel breaker can only be dosed when treating the oilfield wastewater containing the fracturing flowback fluid.

For example, NaOH is added to adjust the pH of the raw wastewater to 8.5 to 9.0 so that the subsequent treatment is performed in a basic environment.

For example, the dosage of the coagulant is 60 mg/L to 300 mg/L. The coagulant can play a role of absorption bridging so that the colloidal particles in the raw wastewater are bonded and agglomerated to larger particles to finally form precipitations. Common coagulants comprise polyaluminum chloride (PAC).

For example, adding $Na_2CO_3$ into the reactor can adjust the pH of the raw wastewater to 10.0 to 10.5, and remove most of iron ions and hardness ions including magnesium ions, calcium ions, barium ions, strontium ions from the raw wastewater. Because the microfiltration unit is unable to filter hardness ions, filtering hardness ions as described above can prevent the decrease of flux of the microfiltration unit caused by scaling of the ions. For example, the softening of the raw wastewater can prevent the membrane concentration unit and the membrane salt separation unit from scaling and membrane damaging caused by repeated cleaning during the concentration process of materials.

For example, magnesium oxide is added into the reactor for removing silica.

For example, adding the flocculant into the reactor can destroy the stability of the colloid, so that the colloid and suspended fine solids in the raw wastewater aggregate to floc with separable characteristic which are subsequently separated and removed. Common used flocculants comprise inorganic salts, such as, aluminum sulfate, aluminum chloride, ferric sulfate, ferric chloride, and other inorganic salts, or polyacrylamide (PAM) and other organic compounds.

For example, the plurality of feeding ports can also be reduced. The demulsifier and the gel breaker share a same feeding port; NaOH and the coagulant share a same feeding port; the silica removing agent and $Na_2CO_3$ share a same feeding port; and the flocculant alone uses one feeding port, so that the number of feeding ports of the reactor is reduced and the cost of the reactor is reduced.

For example, by completing the chemical reactions in the tubular reactor, the complex reaction steps are reduced, the energy consumption is reduced, and the floor area of the equipment is reduced. In addition, agents with similar properties can be added into the same feeding port of the feeding ports, thereby reducing the number of feeding ports of the tubular reactor.

S32: Settling.

For example, a settling tank is used to settle the raw wastewater received from the tubular reactor. The settling tank comprises a water inlet pipe, a water outlet pipe, and an oil collecting pipe disposed at the top of the settling tank; a draft tube is disposed in the center of the settling tank; and a cross sludge discharge pipe is disposed at the bottom of the settling tank. Since the density of oil is less than the density of water, it is required to dispose the oil collecting pipe above the water outlet pipe. For example, in an example, a position of the oil collecting pipe is more than one meter higher than a position of the water outlet pipe.

For example, the raw wastewater discharged from the reactor passes to the water inlet pipe and enters the draft tube of the settling tank. The raw wastewater comprises a lot of precipitates, the precipitates carrying part of the aged oil settles to the cross sludge discharge pipe at the bottom of the settling tank. By adding appropriate agents into the settling tank, the oil in the raw wastewater can float onto the top of the raw wastewater under the action of gravity. After the suspended oil accumulates to an extent, the liquid level of the raw wastewater can be increased by controlling a valve in the water outlet pipe so as to discharge the oil. Then, the oil can be collected from the oil collecting pipe, thereby creating additional economic benefits.

For example, The raw wastewater undergoes solid-liquid separation in the settling tank with a residence time of 4 to 6 hours. According to the status of the raw wastewater, the oil is periodically collected. After the raw wastewater is purified in the settling tank, the load of the subsequent microfiltration unit, the load of the membrane concentration unit and the load of the membrane salt separation are reduced, and further it can effectively reduce the harm of silica scale and hardness substances to the subsequent microfiltration unit, the membrane concentration unit, the membrane salt separation unit, the first evaporative crystallization unit and the second evaporative crystallization unit, so that the microfiltration unit, the membrane concentration unit and the membrane salt separation unit can operate at a higher membrane flux, thereby reducing the consumption of acid, the consumption of base, and the consumption of clean water during backwashing, and prolonging the maintenance and repair cycles and the service life of all of the microfiltration unit, the membrane concentration unit, the membrane salt separation unit, the first evaporative crystallization unit and the second evaporative crystallization unit.

S33: Concentrating.

For example, the raw wastewater is concentrated in the relay pool; the concentrated raw wastewater in the relay pool passes to the microfiltration unit after being pressurized by a pressure pump; and the microfiltration unit returns the concentrated wastewater produced by the filtration of the raw wastewater back to the relay pool.

For example, the relay pool is provided with a liquid agent dosing port and an online pH meter with remote communication function. By adding liquid agent(s) into the relay pool, the acid-base property of the raw wastewater in the relay pool can be adjusted. The online pH meter with remote communication function can provide a real-time feedback of pH of the raw wastewater in the relay pool.

S34: Filtering the wastewater to obtain a solution.

S35: Concentrating the solution to increase the concentration of the monovalent ions and the concentration of the multivalent ions.

S36: Separating monovalent ions and multivalent ions to obtain a first solution comprising the monovalent ions and a second solution comprising the multivalent ions.

S37: Crystallizing the first solution to form a monovalent salt.

S38: Crystallizing the second solution to form a mixed salt.

For example, the treatment methods in the above mentioned steps S34 to S38 can refer to the relevant descriptions in the above mentioned S21 to S25, which are omitted herein.

Figure 8:
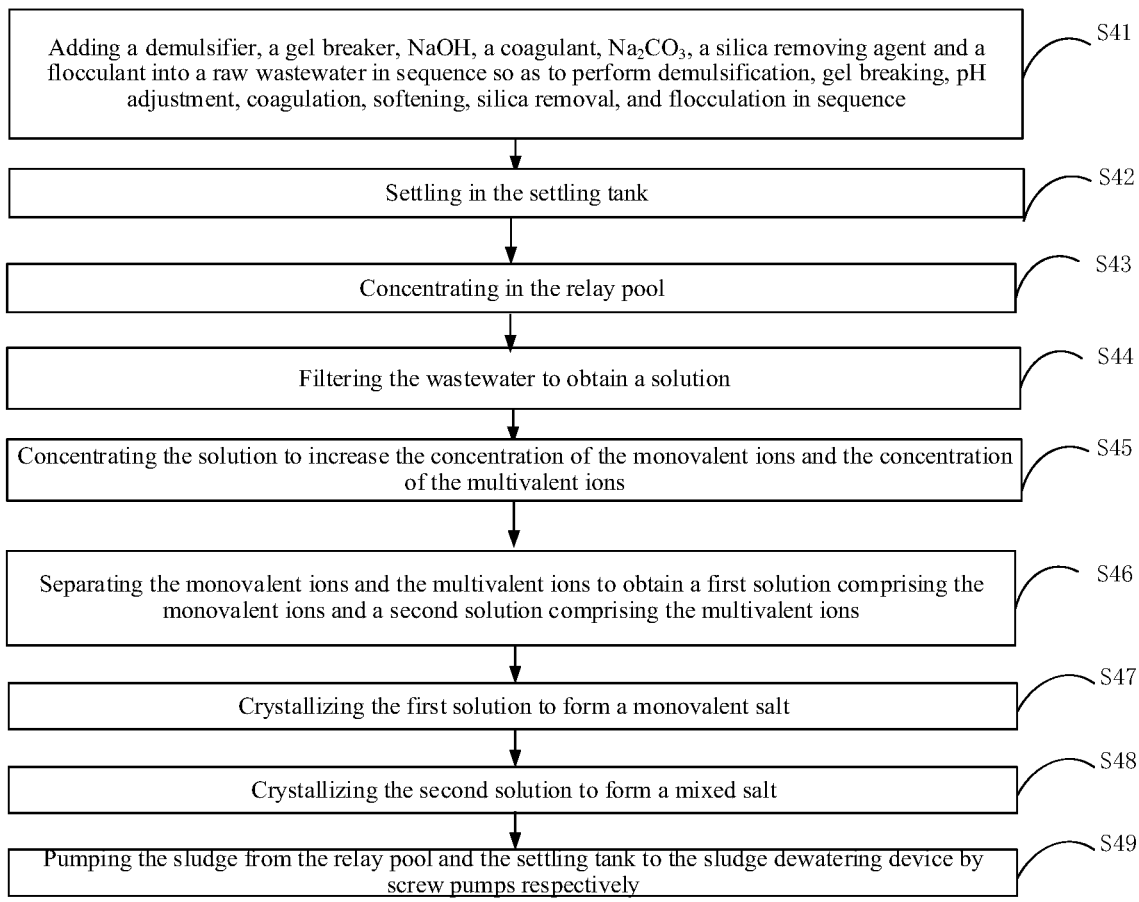
FIG. 8 is a schematic process flowchart of still another wastewater treatment method provided by at least one embodiment of the present disclosure.

For example, in the embodiments of the present disclosure, the settling step and the concentration step of the raw wastewater are performed in the settling tank and the relay pool, respectively. The method further comprises: pumping the sludge from the relay pool and the settling tank to a sludge dewatering device by use of a screw pump. For example, FIG. 8 is a schematic process flowchart of still another wastewater treatment method provided by at least one embodiment of the present disclosure. As shown in FIG. 8, the treatment method of the wastewater comprises:

S41: Adding a demulsifier, a gel breaker, NaOH, a coagulant, $Na_2CO_3$, a silica removing agent and a flocculant into a raw wastewater in sequence so as to perform demulsification, gel breaking, pH adjustment, coagulation, softening, silica removal, and flocculation in sequence.

S42: Settling in the settling tank.

S43: Concentrating in the relay pool.

S44: Filtering the wastewater to obtain a solution.

S45: Concentrating the solution to increase the concentration of the monovalent ions and the concentration of the multivalent ions.

S46: Separating the monovalent ions and the multivalent ions to obtain a first solution comprising the monovalent ions and a second solution comprising the multivalent ions.

S47: Crystallizing the first solution to form a monovalent salt.

S48: Crystallizing the second solution to form a mixed salt.

S49: Pumping the sludge from the relay pool and the settling tank to the sludge dewatering device by screw pumps respectively.

For example, the sludge in the settling tank and the sludge in the relay pool are required to discharge regularly. The settling tank and the relay pool are connected to the sludge dewatering device by screw pumps respectively to realize the regular sludge discharge. The water content of the dewatered wastewater reaches 65% to 85%, and then the sludge is transported to the a designated place.

For example, the above mentioned method of treating the wastewater further comprises: cleaning the microfiltration unit by using powdered activated carbon. For example, the powdered activated carbon is added into the relay pool, followed by passing the powdered activated carbon to the microfiltration unit with the raw wastewater, and then the activated carbon returns to the relay pool with the concentrated water. The powdered activated carbon circulates between the microfiltration unit and the relay pool to repeatedly clean the microfiltration unit, thereby maintaining the flux of the microfiltration unit.

For example, the powdered activated carbon has a particle size of 100 mesh to 200 mesh.

The wastewater treatment equipment and the treatment method provided by the embodiments of the present disclosure have at least one of the following beneficial effects:

(1) In the wastewater treatment equipment provided by at least an embodiment of the present disclosure, the first evaporative crystallization unit and the second evaporative crystallization unit are directly connected to the same membrane salt separation unit, which simplifies the configuration of the wastewater treatment equipment in the premise of ensuring a precise salt separation and enabling the effluent wastewater to satisfy the discharge standards, thus, the operation cost and investment cost are greatly reduced.

(2) The wastewater treatment equipment provided by at least one embodiment of the present disclosure can realize the discharge of wastewater up to the standard, to solve the existing problems of inability of wastewater desalination, limited wastewater discharge, large produce of mixed salt, long technical process, and unstable operation of the wastewater treatment equipment.

The following statements should be noted:

The accompanying drawings involve only the structure(s) in connection with the embodiment(s) of the present disclosure, and other structure(s) can be referred to common design(s).

For the purpose of clarity only, in accompanying drawings for illustrating the embodiment(s) of the present disclosure, the thickness a layer or area may be enlarged or narrowed, that is, the drawings are not drawn in a real scale.

In case of no conflict, embodiments and features in embodiments can be combined with each other to obtain new embodiments.

What are described above is related to the illustrative embodiments of the disclosure only and not limitative to the scope of the disclosure; the scopes of the disclosure are defined by the accompanying claims.

What is claimed is:

1. A wastewater treatment equipment comprising:
   a tubular reactor, a settling tank, a relay pool, a microfiltration structure, an intermediate pool, and a membrane concentrator in this order, wherein the microfiltration structure receives a wastewater and filter the wastewater to obtain a solution;
   a membrane salt separator directly connected to the membrane concentrator to receive the solution and separate monovalent ions and multivalent ions in the solution to obtain a first solution comprising the monovalent ions and a second solution comprising the multivalent ions;
   a first evaporative crystallizer to crystallize the first solution to form a monovalent salt; and
   a second evaporative crystallizer to crystallize the second solution to form a mixed salt;
   wherein the microfiltration structure is connected to the membrane salt separator, and the first evaporative crystallizer and the second evaporative crystallizer are both directly connected to the membrane salt separator,
   wherein the relay pool feeds the wastewater into the microfiltration structure, the microfiltration structure returns concentrated wastewater produced by the microfiltration structure to the relay pool, and the relay pool further contains powdered activated carbons, which are circulated between the relay pool and the microfiltration structure to repeatedly clean the microfiltration structure.

2. The wastewater treatment equipment according to claim 1, wherein a pore size of any one of separation pores in the membrane salt separator is from 1 nm to 2 nm.

3. The wastewater treatment equipment according to claim 1, wherein the membrane concentrator comprises a reverse osmosis membrane, and the membrane concentrator is configured to increase concentration of the monovalent ions and concentration of the multivalent ions in the solution.

4. The wastewater treatment equipment according to claim 3, further comprising the intermediate pool, as well as a water inlet pipeline, a reactor, the settling tank, and the relay pool which are successively connected, wherein the relay pool is directly connected to the microfiltration structure; and the intermediate pool is located between the microfiltration structure and the membrane concentrator.

5. The wastewater treatment equipment according to claim 4, wherein the tubular reactor comprises a plurality of feeding ports arranged in sequence along a flow direction of the wastewater in the tubular reactor.

6. The wastewater treatment equipment according to claim 5, wherein the plurality of the feeding ports comprise a first feeding port, a second feeding port, a third feeding port, a fourth feeding port, a fifth feeding port, a sixth feeding port, and a seventh feeding port, and the first feeding port, the second feeding port, the third feeding port, the fourth feeding port, the fifth feeding port, the sixth feeding port and the seventh feeding port are configured to apply a demulsifier, a gel breaker, NaOH, a coagulant, $Na_2CO_3$, a silica removing agent and a flocculant, respectively.

7. The wastewater treatment equipment according to claim 3, wherein a pressure pump is arranged between the membrane concentrator and the membrane salt separator.

8. The wastewater treatment equipment according to claim 3, further comprising a clean water tank, wherein a clean water pipe of the first evaporative crystallizer, a clean water pipe of the second evaporative crystallizer and a clean water pipe of the membrane concentrator are all connected with the clean water tank.

9. The wastewater treatment equipment according to claim 1, wherein each of the first evaporative crystallizer and the second evaporative crystallizer is one of a multiple effect evaporator, a mechanical vapor compression evaporator and a mechanical vapor recompression evaporator.

10. The wastewater treatment equipment according to claim 1, wherein the microfiltration structure is made from a sintered polyvinylidene fluoride, and a pore size of any one of separation pores in the microfiltration unit is from 0.02 µm to 0.5 µm.

11. The wastewater treatment equipment according to claim 4, wherein the relay pool is provided with a liquid agent dosing port and an online pH meter with remote communication function.

12. The wastewater treatment equipment according to claim 4, further comprising a sludge dewatering structure, wherein the settling tank and the relay pool are connected to the sludge dewatering structure by screw pumps respectively.

13. The wastewater treatment equipment according to claim 12, wherein the sludge dewatering structure comprises a plate-and-frame filter press machine or a coiled sludge dewatering machine.

14. A treatment method of a wastewater comprising:
filtering the wastewater to obtain a solution;
separating monovalent ions and multivalent ions in the solution to obtain a first solution comprising the monovalent ions and a second solution comprising the multivalent ions;
crystallizing the first solution to form a monovalent salt; and
crystallizing the second solution to form a mixed salt,
wherein before the filtering the wastewater, the treatment method further comprises a pretreatment step, wherein the pretreatment step comprises:
adding a demulsifier, a gel breaker, NaOH, a coagulant, $Na_2CO_3$, a silica removing agent and a flocculant into a raw wastewater in sequence so as to perform demulsification, gel breaking, pH adjustment, coagulation, softening, desilication, and flocculation reaction in sequence, followed by settling and concentrating steps.

15. The treatment method according to claim 14, wherein after the filtering the wastewater and before the separating the monovalent ions and the multivalent ions in the solution, the treatment method further comprises: concentrating the solution to increase concentration of the monovalent ions and concentration of the multivalent ions.

16. The treatment method according to claim 14, wherein the settling and the concentrating steps are performed in a settling tank and a relay pool, respectively, and the treatment method further comprises: pumping sludge in the relay pool and sludge in the settling tank into a sludge dewatering device.

17. The treatment method according to claim 14, wherein the wastewater is filtered in a microfiltration structure to obtain the solution, and the treatment method further comprises: cleaning the microfiltration structure by using powdered activated carbon.

18. The treatment method according to claim 17, wherein the powdered activated carbon has a particle size of 100 mesh to 200 mesh.

* * * * *